(12) United States Patent
Hoshino

(10) Patent No.: US 6,912,299 B1
(45) Date of Patent: Jun. 28, 2005

(54) DEVICE FOR DETECTING A FINGERPRINT, ELECTRIC APPARATUS AND DOORKEEPER APPARATUS

(75) Inventor: Satoshi Hoshino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/252,034

(22) Filed: Feb. 18, 1999

(30) Foreign Application Priority Data

Feb. 18, 1998 (JP) .......................................... 10-036254

(51) Int. Cl.[7] .................................................. G06K 9/00
(52) U.S. Cl. ....................... 382/124; 340/5.53; 340/5.83
(58) Field of Search ................................ 382/115, 124, 382/125, 120, 127; 235/380, 492; 704/246, 273; 902/3, 4, 25; 283/68; 356/71; 705/1, 26, 42; 200/521, 539, 342, 305; 340/5.1, 5.2, 5.52, 5.53, 5.8, 5.81, 5.82, 5.83, 825.3, 825.34

(56) References Cited

U.S. PATENT DOCUMENTS 4,025,748 A * 5/1977 Filip ........................... 200/308
4,353,056 A * 10/1982 Tsikos ....................... 340/146.3
4,642,433 A * 2/1987 Murata ........................ 200/308
5,559,504 A * 9/1996 Itsumi et al. ............. 340/825.3

FOREIGN PATENT DOCUMENTS

| DE | 2952212 | * | 12/1980 |
| JP | 58-201178 | * | 11/1983 |
| JP | 63-5551 | * | 1/1988 |
| JP | 64-68894 | * | 3/1989 |

* cited by examiner

Primary Examiner—Samir Ahmed
(74) Attorney, Agent, or Firm—Young & Thompson

(57) ABSTRACT

When a contact surface 6 of a finger print input section 1 is pushed down by a fingertip and the projected portion 6b faces the recessed portion 10a, the projected portion 6b slides into the recessed portion 10a so that the contact surface 6 is put in a locked state. At this time, a switch 9 is turned on and sends a signal to a fingerprint detecting portion 11. Responsive to the signal, the detecting portion 11 scans the fingertip on the contact surface 6 to be converted into a sequence of electric signal and to be stored into a memory. The fingerprint detecting portion 11 compares a fingerprint with the fingerprint data signal stored in the memory 5 to identify a fingerprint. With this structure, the pressure imposed by the fingertip onto the fingerprint input section 1 is kept constant during detection of the fingerprint.

15 Claims, 5 Drawing Sheets

DEVICE FOR DETECTING A FINGERPRINT, ELECTRIC APPARATUS AND DOORKEEPER APPARATUS

BACKGROUND OF THE INVENTION

This invention relates to a device for detecting a fingerprint. Also, this invention relates t, an electric apparatus and a doorkeeper apparatus with built in device for detecting a fingerprint.

Conventionally, the collation of the fingerprint has been widely used to confirm and identify a person. This is because the fingerprint of each person has immutability and uniqueness. Recently, a device for detecting a fingerprint has been realized to automatically execute fingerprint collation by using the image recognition technology by a computer.

There is the following device as the example of such fingerprint detecting device. When the fingertip is pushed against the glass face of a prism, light is irradiated to the pushed place from inside of glass. A CCD (charge coupled device) camera scans a pattern of intensity of reflected light from the prism and converts the pattern photoelectrically into electricity signals. Like this, this device is using the optical technique to measure the unevenness of the fingerprint that contacted with the glass face, by detecting a variable reflection condition.

Alternately, another device comprises a pressure-sensitive sheet and matrix electrode formed on the pressure-sensitive sheet and measures a variation of the electric resistance when the sheet is pushed by a finger. A further device includes an insulator and pair of electrodes on both sides of the insulator to measure a change of capacitance between these electrodes when a fingertip pushes one of the electrodes. Other than these devices, there is a device that has sensors each of which is arranged in a matrix shape and which is formed by field effect transistor and piezoelectric thin films attached to the channel areas of the field effect transistors. The last-mentioned device can measure electric charges that occur on the piezoelectric thin films when the sensors are pushed by a fingertip.

At any rate, all of the above-mentioned devices for detecting a fingerprint are ready for detecting a fingerprint on pushing the fingerprint input section by a fingertip. This shows that the devices can not accurately detect the fingerprint due to a variation of pressure on pressing the fingertip on the fingerprint input section. Specifically, the pressure is often insufficient or too high to detect the fingerprint. In addition, the pressure that is given to the fingerprint input section is also varied or fluctuated at every person. As the result, errors are very often to happen on the detection of the fingerprint in the conventional device. This makes it difficult to accurately execute collation.

SUMMARY OF THE INVENTION

Therefore, it is an object of the invention to provide a device for detecting a fingerprint that can detect a fingerprint with a low error. It is another object of the invention to provide a device for detecting a fingerprint of the type described, which can reduce a variation of a pressure given to a fingerprint input section. It still another object of the invention to provide an electric apparatus and a doorkeeper apparatus that incorporates the above-mentioned device.

According to this invention, a device, which detects a fingerprint of a fingertip placed on a contact surface of a fingerprint input section, comprises a moving element for moving the contact surface when the fingertip is placed on the contact surface, a lock mechanism for fixing the contact surface when the contact surface is moved to predetermined position, and a detecting unit for detecting the fingerprint when the contact surface is fixed by the lock mechanism to the predetermined position.

In the above-mentioned device for detecting a fingerprint, the lock mechanism may comprise a switch for producing a signal when the contact surface is fixed to the lock mechanism and the detecting unit is energized to detect the fingerprint when the detecting unit receives the signal from the switch.

In the above-mentioned device for detecting a fingerprint, the moving element may comprise an energizing member which withstands movement of the contact surface to make a pressure imposed onto the contact surface substantially uniform until the contact surface is fixed to the predetermined position.

The device for detecting a fingerprint mentioned above may comprise a memory for storing a sequence of fingerprint data signals, which is detected from a fingertip and compare a fingerprint of the fingertip placed currently on the contact surface with the fingerprint data signal sequence stored in the memory.

For one example, the detecting unit comprises a solid-state image sensor for scanning a fingerprint image into a sequence of data signals.

For another example, the detecting unit comprises a converting circuit to convert a variable pressure from the fingertip into a variable electric resistance and a measuring circuit to measure the variable electric resistance.

And for another example, the detecting unit comprises a converting circuit to convert a variable pressure from the fingertip into a variable capacitance and a measuring circuit to measure the variable capacitance.

According to this invention, an electric apparatus, which executes a predetermined operation and which includes the above-mentioned device, may be powered when the fingerprint data signal sequence of the fingertip placed currently on the contact surface is stored in the memory. In this electric apparatus, the device may be operable as a power switch.

According to this invention, an electric apparatus, which executes a predetermined operation and which includes the above-mentioned device, may be powered when the fingertip placed currently on the contact surface is coincident with the fingerprint data signal sequence stored in the memory. In this electric apparatus, the device may be operable as a power switch.

According to this invention, a doorkeeper apparatus, which controls a door lock mechanism and which includes the above-mentioned device, may open a door when the fingerprint data signal sequence of the fingertip placed currently on the contact surface is stored in the memory. In this doorkeeper apparatus, the device is operable as a doorbell switch.

According to this invention, a doorkeeper apparatus, which controls a door lock mechanism and which includes the above-mentioned device, may open a door when the fingertip placed currently on the contact surface is coincident with the fingerprint data signal sequence stored in the memory. In this doorkeeper apparatus, the device is operable as a doorbell switch.

DESCRIPTION OF THE PREFERRED EMBODIMENT

Figure 1:
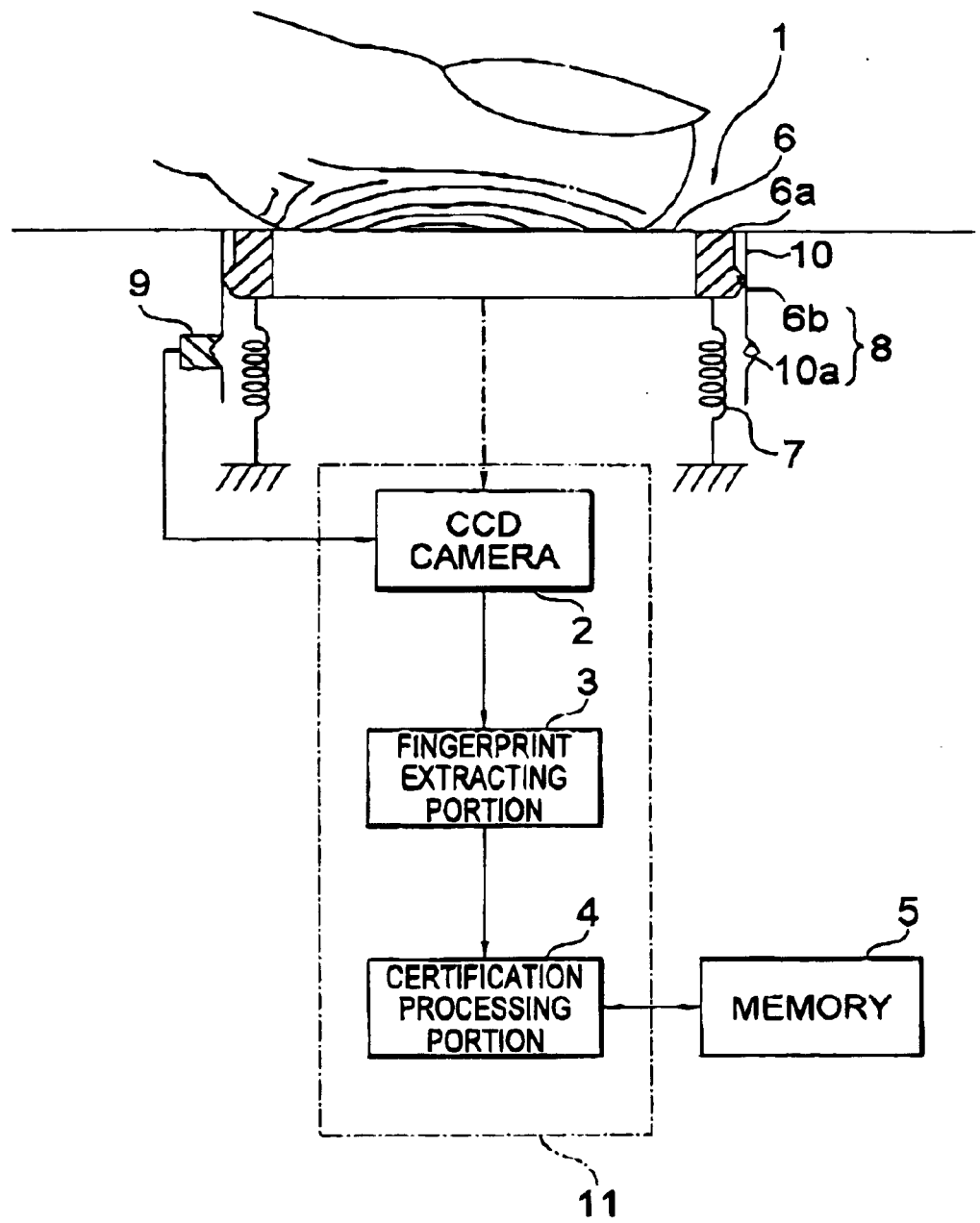
FIG. 1 shows a schematic view of a device for detecting a fingerprint according to an embodiment of this invention.
Figure 2:
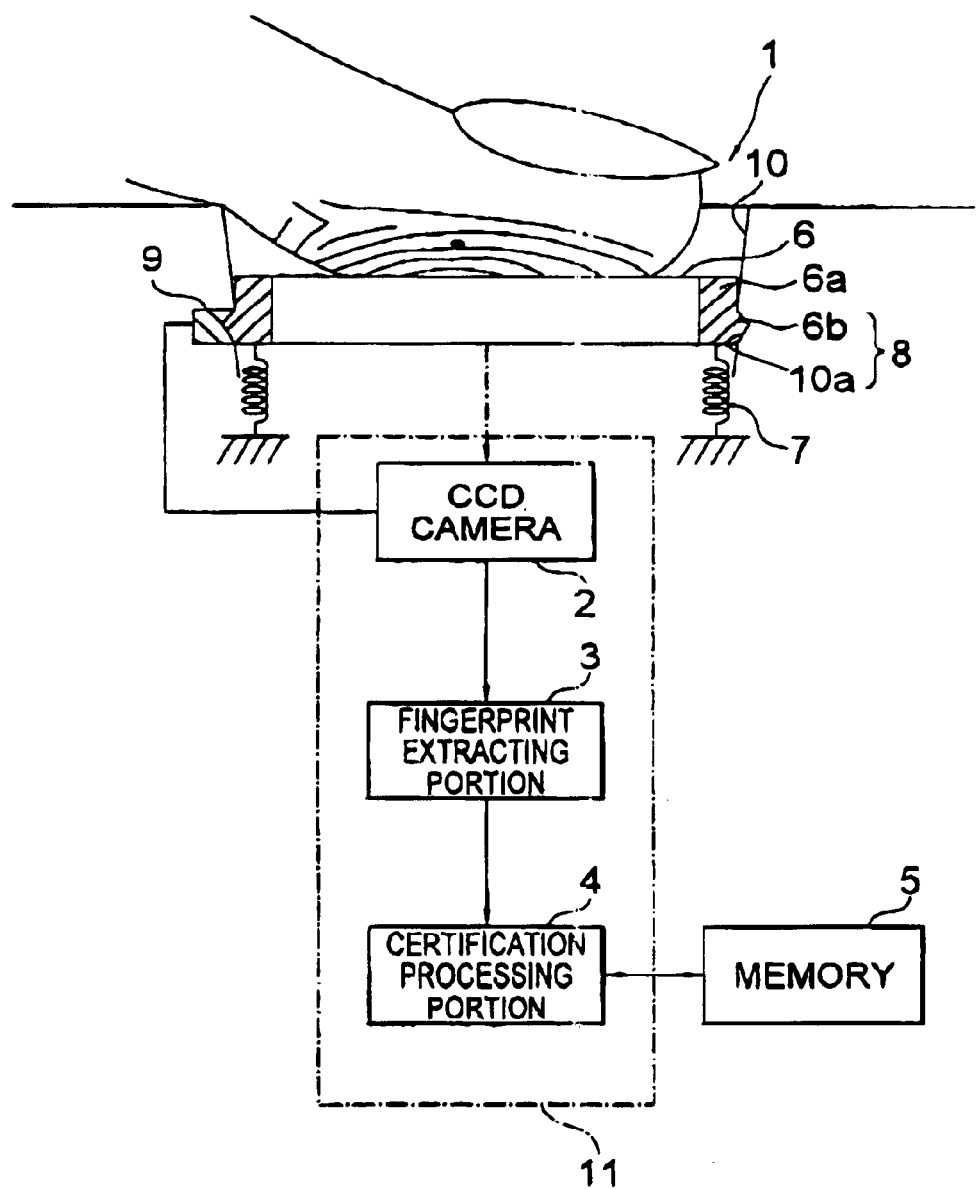
FIG. 2 is a schematic view of the device for detecting a fingerprint of FIG. 1, which is put into a state of detecting a fingerprint.

Next, description will be made about a device for detecting a fingerprint according to each embodiment of the invention in reference to drawings:

In FIGS. 1 and 2, the device for detecting a fingerprint according to a first embodiment optically detects a fingerprint of a fingertip.

More particularly, the illustrated device for detecting a fingerprint comprises a detecting unit 11, a fingerprint input section 1, and a memory 5. The illustrated detecting unit 11 includes a CCD camera 2, fingerprint extracting portion 3 and a certification processing portion 4. On the other hand, the fingerprint input section 1 has a contact surface 6 an energizing member 7, such as a spring, mechanically coupled to the contact surface 6, and a block mechanism, namely, a lock mechanism 8. With this structure, the contact surface 6 is pushed down in cooperation with the spring 7 when the fingertip is placed on the contact surface 6. This shows that the spring 7 withstands downward movement of the contact surface 6 when the fingertip is placed on the contact surface 6 and that the contact surface 6 moves upwards when the fingertip is removed from the contact surface 6. In other words, the spring 7 provides mechanical resist against a pressure of the fingertip.

When the contact surface 6 is pushed down to the lock mechanism 8 placed at a predetermined position, it is locked by the lock mechanism 8.

In the illustrated example, a switch 9 is located at the lock mechanism 8, namely, the predetermined position and is electrically contacted with a conductive peripheral frame 6a which surrounds the contact surface 6.

When the conductive peripheral frame 6a is electrically contacted with the switch 9, an electric signal is sent to the CCD camera 2 of the detecting unit 11.

More specifically, the contact surface 6 is formed of a glass face of a prism. When the energizing member or spring 7 is put into a stationary state, the fingerprint input section 1 is kept an initial state shown in FIG. 1. In this event, the lock mechanism 8 holds contact surface 6 at an initial position in the initial state. The illustrated lock mechanism 8 is formed my a projected portion 6b projected from the frame 6a of the contact surface 6 and a recessed portion 10a on a holder 10. The projected portion 6b is engaged with the recessed portion 10a at the predetermined position. The holder 10 includes a leaf spring or the like which is bent easily.

When the contact surface 6 moves up and down, the holder 10 is deflected or deformed outwards and the contact surface 6 is slid into the recessed portion 10a of the holder 10 and makes the projected portion 6b engaged with the recessed portion 10a (FIG. 2) in order to fix the contact surface 6 to the holder 10. When the contact surface 6 is just pushed at the predetermined portion where the projected portion 6b is engaged with the recessed portion 10a, the engagement between the projected portion 6b and the recessed portion 10a is released and the contact surface 6 is able to be moved upwards again. After leaving the fingertip from the contact surface 6, the contact surface 6 returns back to the initial state by the restoring force of the energizing member 7. The energizing member 7 causes the finger to contact with the contact surface 6. The restoring force of the energizing member 7 is previously determined so that the pressure from the fingertip to the contact surface 6 is suitable for detecting a fingerprint when the projected portion 6b is engaged with the recessed portion 10a. Although not shown in the drawing, when the projected portion 6b is engaged with the recessed portion 10a, the switch 9 is interlocked with the holder 10 and is turned on in order to send the signal to the CCD camera 2.

Supplied with the signal from the switch 9, the CCD camera 2 scans an intensity pattern of light that is reflected by the fingertip irradiated through the contact surface 6. The resultant image is sent to the fingerprint extracting portion 3 and a fingerprint date is extracted from the resultant image. The fingerprint extracting portion 3 outputs the fingerprint data as a sequence of electric signals which is thereafter sent to the certification processing portion 4.

Figure 3:
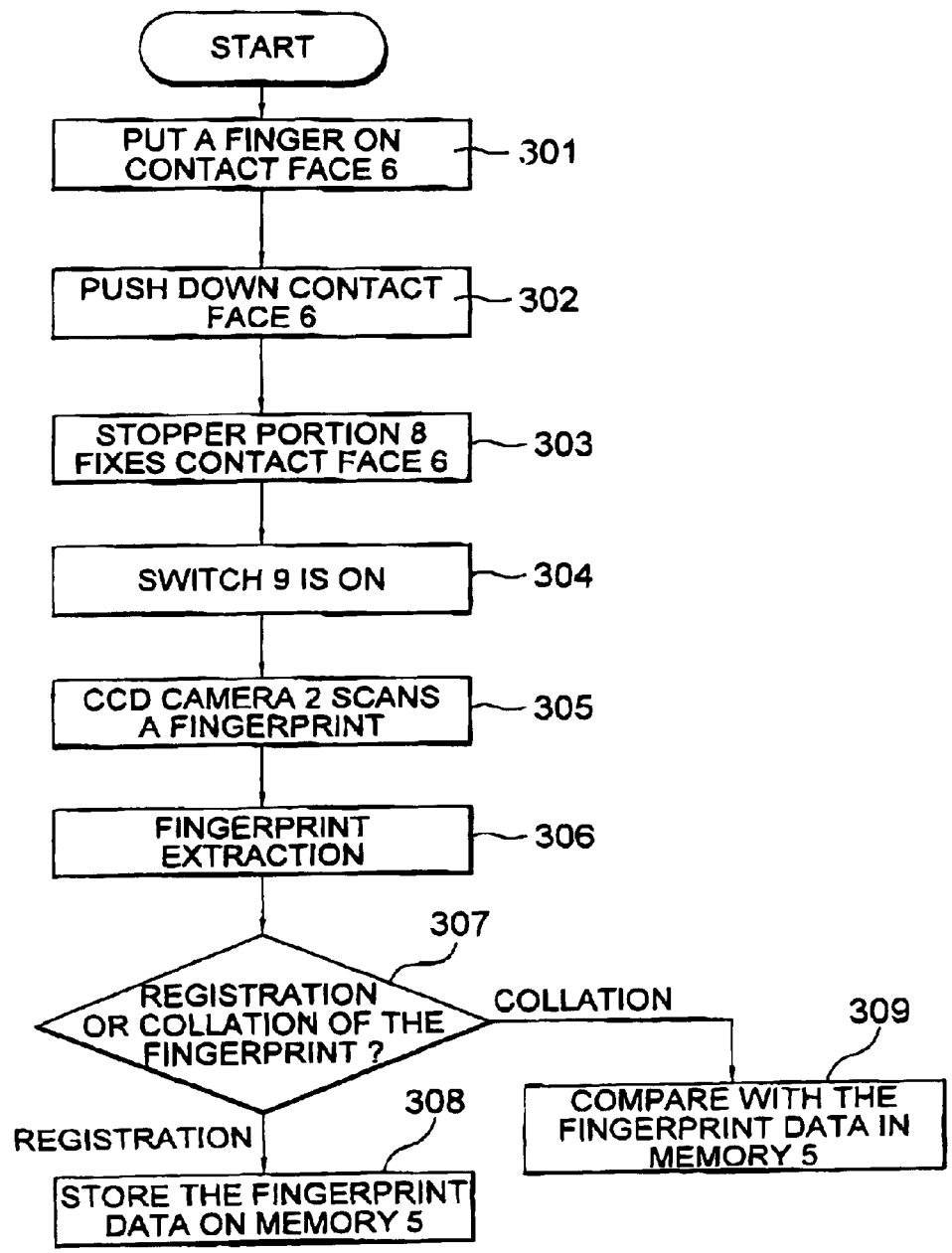
FIG. 3 is a flow chart for use in describing an operation which is executed in the device for detecting a fingerprint shown in FIGS. 1 and 2.

FIG. 3 shows the flow chart of the fingerprint detection process in this embodiment. In the initial state illustrated in FIG. 1, a fingertip is placed on the contact surface 6 of the fingerprint input section 1 (STEP 301) and the fingertip pushes down the contact surface 6 (STEP 302). When the contact surface 6 is moved downwards until the projected portion 6b faces to the recessed portion 10a, the projected portion 6b and recessed portion 10a are engaged with each other and the contact: surface 6 is locked (STEP 303). At this time, the switch 9 interlocks with the lock mechanism 8 and is turned on to supply the signal to the CCD camera 2 (STEP 304). The CCD camera 2 receives this signal and scans the fingertip on the contact surface 6 (STEP 305). The results of scanning are sent to the fingerprint extracting portion 3 which extracts the fingerprint data from the results (STEP 306). Upheaved portions on ridge of the fingerprint are tightly contacted with the contact surface 6, the reflected light in the contacted portions is varied in depending upon reflected conditions and is converted into the electric signal sequence is sent to the certification processing portion 4. The certification processing portion 4 executes the registration or collation of the fingerprint (STEP 307). In the case of the fingerprint registration, the electric signal sequence is stored in the memory 5 (STEP 308). In the case of the fingerprint collation, the fingerprint is compared with a data sequence which is previously stored in the memory 5 (STEP 309).

According to the embodiment, when the contact surface 6 is pushed down to the predetermined position, the projected portion 6b and the recessed portion 10a are connected to each other due to operation of the lock mechanism 8. As a result, the pressure on the contact surface 6 at the predetermined position is kept constant. At the same time, the switch 9 is put in an on-state and the CCD camera scans the image of the fingerprint with a constant pressure added to the contact surface 6 by the fingertip for a scanning time interval, namely, a time interval of detecting the fingerprint actually. Therefore, the fingertip is detected with a suitable pressure imposed onto the contact. Therefore, the device for detecting a fingerprint according to the embodiment of the invention can reduce errors on detection of the fingerprint and also correct the errors.

On the other hand, a click impression or a feeling of engagement from the lock mechanism 8 can inform the user whether the pressure of the fingertip is sufficient or not. In other words, a user can adjust the pushing power of the fingertip until the click impression is obtained. Until the click impression is obtained, the user continues to push the contact surface 6 and may increase the pressure. Thus, the click impression notifies the user of unnecessity of pushing the contact surface 6 any more. Therefore, the click impression prevents insufficient and surplus pressure of the fingertip.

Furthermore, although the device for detecting a fingerprint mentioned about optically detects the image of the fingerprint, this invention is not limited to this embodiment. This invention is applicable to a device for detecting a fingerprint which uses various methods for a detecting fingerprint. For example, the detecting methods may be executed by using a pressure sensitive sheet, by measuring a change of capacitance change between electrodes, by using field effect transistors or the else. Also, the contact surface 6 of the fingerprint input section 1 is not limited to the glass face of the prism. A material of the contact surface 6 may be, for example, a fiber optical plate, semiconductor sensors, and micro prism sensors or the like.

Figure 4:
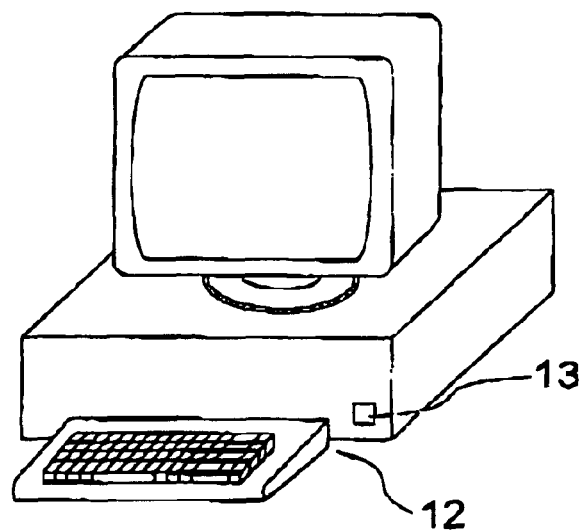
FIG. 4 shows a perspective view of a personal computer that is exemplified as an electric apparatus which can execute the operation.

The device for detecting a fingerprint of this invention mentioned above may be incorporated into various electric apparatus. For example, the device of this invention is incorporated in a power switch (a push button) 13 of a personal computer 12 or a workstation shown in FIG. 4.

In order to limit users of a personal computer in question, a password is usually given to every regular user and anyone who does not enter the correct password cars not operate the personal computer.

However, if the fingerprint detecting apparatus of this invention is incorporated in the power switch 13 of the personal computer 12, it is possible that the power supply becomes ON and the personal computer 12 starts only in the case that the fingerprint of person who touches the power switch is matched with a fingerprint registered in advance. This makes it unnecessary to set a password and to input the password. Also, the personal computer including both this invention and a password system permits the use of registered user who forgets the password and rejects the use of an unregistered user who obtains a password illegally.

Similarly, the device for detecting a fingerprint of this invention may be also incorporated in pushbutton switches of various electric apparatus like a television set and an audio apparatus etc. In this case, it is possible to restrict uses of the electric apparatus.

Figure 5:
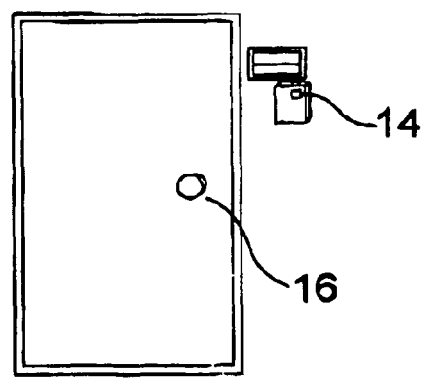
FIG. 5 is a front view of a doorkeeper apparatus of this invention.
Figure 6:
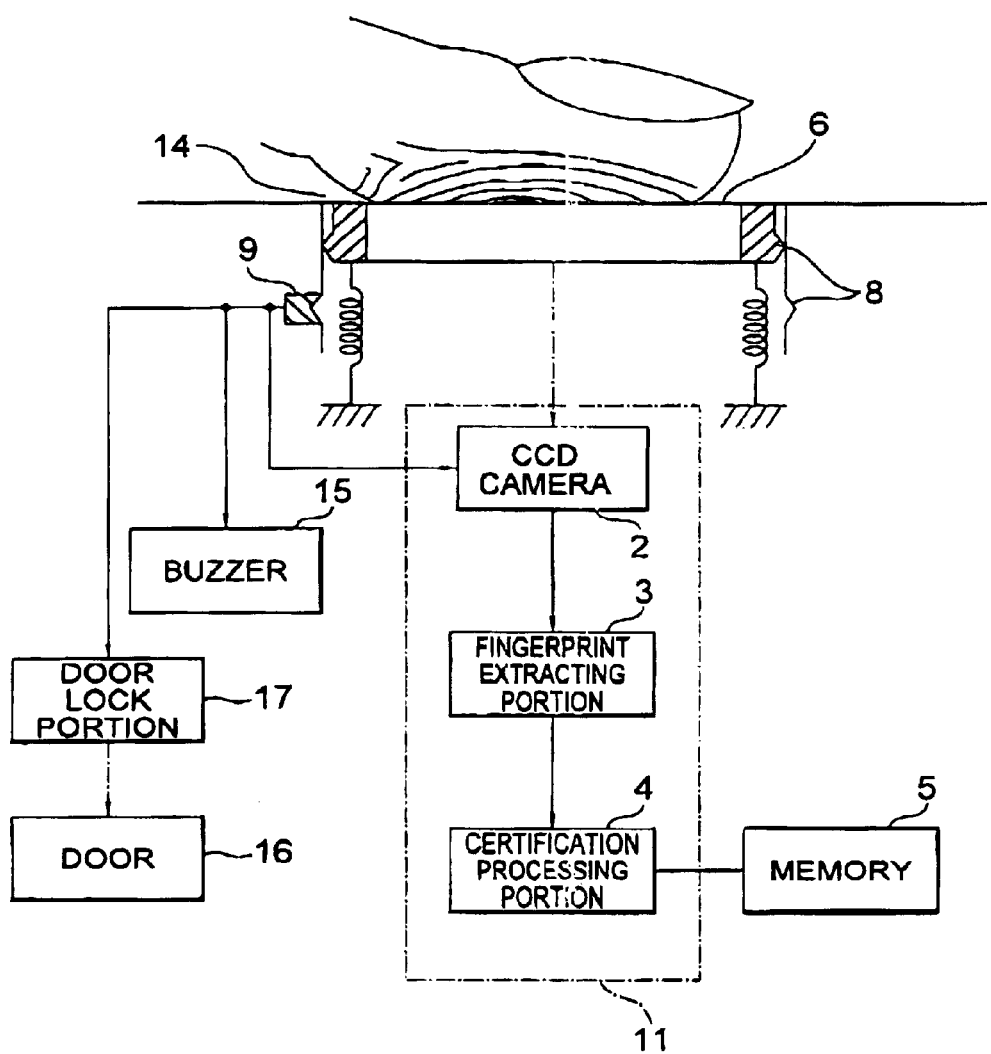
FIG. 6 is a block diagram of the doorkeeper apparatus shown in FIG. 5.

As shown in FIGS. 5 and 6, the fingerprint detecting apparatus of this invention may be also incorporated in a doorkeeper apparatus which includes a buzzer switch (a push button) 14. This doorkeeper apparatus registers or stores fingerprint of a family in a memory 5 in advance. When the buzzer switch 14 is pushed, the doorkeeper apparatus compares the registered fingerprints of the family with a fingerprint of a finger that touches the buzzer switch 14. Only when the touching the fingerprint in question is matched to with the registered one, the doorkeeper apparatus sounds the buzzer 15 and releases the lock of the door lock portion 17 to open the door 16. According to this doorkeeper apparatus, a person 9 whose fingerprint data are registered can open the door without the key. On the other hand, a person whose fingerprint data are not registered can never open the door. Therefore the doorkeeper apparatus is applicable to a security system of a company etc.

Furthermore, the device for detecting a fingerprint of this invention may be incorporated in a pushbutton switch that exist in various apparatus originally. This means the device for detecting a fingerprint does not need any new switches related to fingerprint detection. Therefore, the apparatus of the invention is simple in structure and in low in cost.

As mentioned above, this invention can detect always a fingerprint when a regular pressure is added to the contact surface, namely, this invention can detect the fingerprint with an optimal pressure imposed by a fingertip. Therefore, this invention improves the precision of detecting a fingerprint.

Also, this invention can notify whether or not the pressure of the fingertip is sufficient enough to detect the fingerprint correctly by the presence of the click impression of the lock mechanism to the user. Consequently, this invention can easily prevent the fingertip's pressure from becoming too high or too low when the fingerprint is detected.

The fingerprint detecting apparatus of this invention may be incorporated to the power switches of various electric apparatus. As mentioned above, the doorbell switch of doorkeeper apparatus that includes the device for detecting a fingerprint can restrict the user of these apparatus at a low cost in a simple structure.

While this invention has thus far been described in conjunction with a few embodiments thereof, it will be readily possible for those skilled in the art to put the this invention into various other manners.

What is claimed is:

1. A device for detecting a fingerprint of a fingertip placed on a contact surface that moves up and down and is part of a fingerprint input section, the device comprising:

a moving element opposing downward movement of the contact surface when the contact surface is pressed downward by a fingertip whose fingerprint is to be detected;

a restraint having a detent position at a depressed location of the contact surface and urging the contact surface to remain in the detent position when a first pressure is applied to the contact surface by a fingertip and permitting movement of the contact surface above the detent position when pressure on the contact surface is less than the first pressure, wherein said restraint comprises a spring member with a recess that defines the detent position, wherein the contact surface comprises a projection that fits into said recess when the contact surface is in the detent position, wherein said spring member comprises a leaf spring that is urged radially outward by said projection when said projection is not in said: recess; and a detecting unit detecting a fingerprint on the contact surface when the contact surface is in the detent position.

2. The device of claim 1, further comprising a switch at the detent position that activates said detector when the contact surface is in the detent position.

3. The device of claim 2, wherein said projection contacts said switch when the contact surface is in the detent position.

4. A device as claimed in claim 1, comprising:

a memory for storing a sequence of fingerprint data signals, which is detected from a fingertip; and means for comparing a fingerprint of the fingertip placed currently on said contact surface with the fingerprint data signal sequence stored in said memory.

5. A device as claimed in claim 1, wherein said detecting unit comprises a solid-state image sensor for scanning a fingerprint image into a sequence of data signals.

6. A device as claimed in claim 1, wherein said detecting unit comprises:

a converting circuit to convert a variable pressure from the fingertip into a variable electric resistance; and a measuring circuit to measure said variable electric resistance.

7. A device for detecting a fingerprint as claimed in claim 1, wherein said detecting unit comprises:

a converting circuit to convert a variable pressure from the fingertip into a variable capacitance;

a measuring circuit to measure said variable capacitance.

8. An electric apparatus which executes a predetermined operation and which includes the device claimed in claim 4, wherein said electric apparatus is powered when the fingerprint data signal sequence of the fingertip placed currently on said contact surface is stored in said memory.

9. An electric apparatus as claimed in claim 8, wherein the device is operable as a power switch.

10. An electric apparatus which executes a predetermined operation and which includes the device claimed in claim 4, wherein said electric apparatus is powered when the fingertip placed currently on said contact surface is coincident with the fingerprint data signal sequence stored in said memory.

11. An electric apparatus as claimed in claim 10, wherein the device is operable as a power switch.

12. A doorkeeper apparatus which controls a door lock mechanism and which includes the device claimed in claim 4, wherein said doorkeeper apparatus opens a door when the fingerprint data signal sequence of the fingertip placed currently on said contact surface is stored in said memory.

13. A doorkeeper apparatus as claimed in claim 12, wherein the device is operable as a doorbell switch.

14. A doorkeeper apparatus which controls a door lock mechanism and which includes the device clamed in claim 4, wherein said doorkeeper apparatus opens a door when the fingertip placed currently on said contact surface is coincident with the fingerprint data signal sequence stored in said memory.

15. A doorkeeper apparatus as claimed in claim 14, wherein the device is operable as a doorbell switch.

* * * * *